Sept. 19, 1939.  G. B. RAYBURN  2,173,540
FISH LURE
Original Filed May 26, 1938
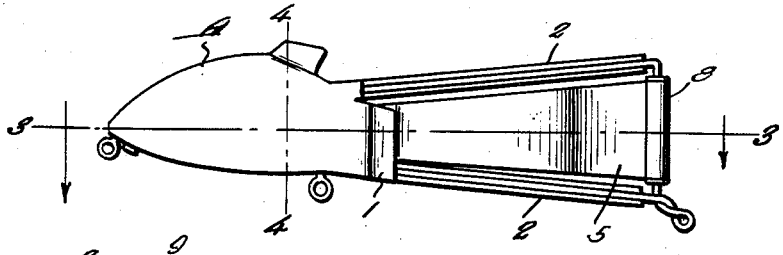
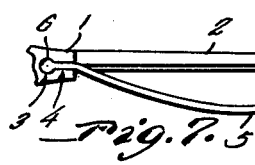
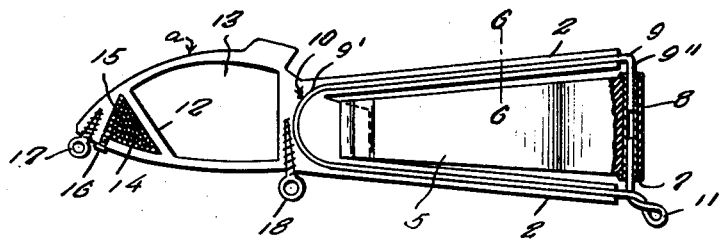
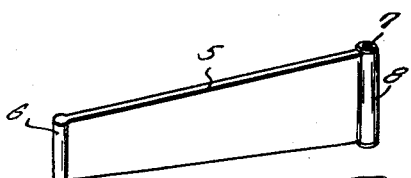
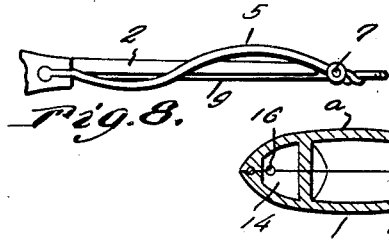
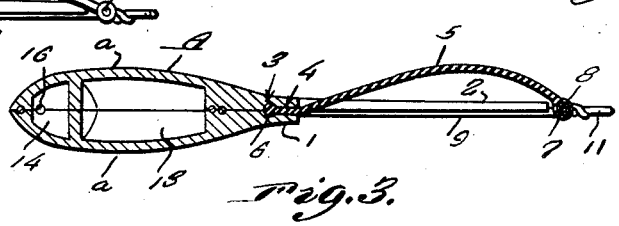
Inventor
G. B. Rayburn
By Clarence A. O'Brien
and Hyman Berman
Attorneys Patented Sept. 19, 1939

2,173,540

UNITED STATES PATENT OFFICE 2,173,540

FISH LURE

George B. Rayburn, Los Angeles, Calif.

Original application May 26, 1938, Serial No. 210,232. Divided and this application September 13, 1938, Serial No. 229,737

4 Claims. (Cl. 43—46)

This invention relates to a fish lure, the present application being an improvement over that disclosed in application filed by me on May 26, 1938, Serial No. 210,232.

The general object of the present invention is to make the tail removable so that it can be replaced by a new one when worn or if it is desired to substitute a tail of a different color from the tail which it replaces.

Another object of the invention is to provide the body with chambers to make the body buoyant and to provide means whereby shot or the like can be placed in one chamber, when it is desired to cause the lure to sink below the surface of the water.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is an elevation of the improved lure.

Figure 2 is an elevation with one-half of the lure removed and this view shows the rear part of the tail in section.

Figure 3 is a section on the line 3—3 of Figure 1.

Figure 4 is a section on the line 4—4 of Figure 1.

Figure 5 is a view of the tail.

Figure 6 is a section on the line 6—6 of Figure 2.

Figures 7 and 8 are plan views showing how the tail is moved by the water as the lure is drawn through the water.

This drawing shows the body of the lure as composed of two sections which are cemented or otherwise connected together to form the complete body, but it is to be understood that the body can be formed in any suitable manner.

The body is shown at A and may be in the form of a fish or other creatures inhabiting the water and said body is shown in the drawing as composed of the two sections $a$ extending longitudinally and cemented or otherwise connected together at their inner sides to form the complete body. The body is formed with a reduced rear portion 1 and upper and lower arms 2 extend rearwardly from the rear portion of the body and slightly diverge rearwardly. Each arm is of substantially semi-tubular form in cross section as shown in Figure 6 with the grooves facing in the same direction. A vertically arranged hole 3 extends downwardly from the top of the reduced part 1 and a channel 4 extends from the hole through the rear end of the part 1. The tail 5 is formed of rubber or the like and tapers forwardly and has a bead 6 at its front end for fitting in the hole 3 with a part of the tail adjacent the bead passing through the channel as shown in Figure 3. A small spool-like member 7 passes through an enlargement 8 at the rear end of the tail and a member 9 formed of spring wire or the like and of substantially U-shape has its bight 9' passing through a U-shaped passage in the rear part of the body and having its ends communicating with the front ends of the grooves formed by the arms 2. This passage is formed by a U-shaped groove 10 formed in each section $a$ of the body, on the inner face of the sections. The limbs of the member 9 will pass through the grooves of the arms 2 and the rear ends are bent inwardly as at 9'' to enter the spool-like member 7 and a loop 11 is formed in the lower limb of the member 9 and extends rearwardly and downwardly to support a fish hook.

By moving the legs or limbs of the member 9 out the grooves of the arms 2, said legs or limbs can be moved apart so as to move the bent ends 9'' out of the spool-like member 9 and then the front end of the tail can be moved out of the hole 3 and channel 4 from the top of the body. This permits a new tail to be substituted for the old one and this is desirable for replacing a worn tail by a new one or by substituting a tail of a different color from the original tail.

This tail will move with a wave motion back and forth as the lure is drawn through the water, the same as the tail shown and described in the original application, this movement being shown in Figures 7 and 8. As will be seen the tail holding parts are so arranged that they will hold the tail in a loop as shown in Figure 3 and as the lure is drawn through the water, the pressure of the water against the front portion of the tail, at one side of the body will gradually press the tail toward the other side until the tail reverses itself from the position shown in Figure 3 to that shown in Figure 7, Figure 8 showing the intermediate part of the movement of the tail. Then when the tail assumes the position shown in Figure 7 the pressure of the water will act to cause it to move back to the position shown in Figure 3. Thus the water gives the tail a wave motion as the lure is drawn through the water.

The major portion of the body is made hollow and a downwardly and rearwardly sloping partition 12 divides the hollow part into a large rear chamber 13 and a small front chamber 14. When the lure is to be pulled along the surface both chambers act as air chambers but if it is desired to have the lure sink below the surface, shot 15 or the like can be placed in the front chamber 14 through an opening in the body which is normally closed by a screw 16. Of course, some of the shot can be placed in the chamber 14 to cause the body to assume an upright position in the water. A screw eye 17 is connected with the front end of the body to receive the line and a second screw eye 18 is screwed into the body from the underside thereof and in the rear of the chamber 13 to receive a fish hook.

As will be seen the partition 12 will retain the weight material 15 at a comparatively low position and thereby produce a low center of gravity, causing the lure to float in an upright position or to sink below the surface of the water, if sufficient weight material is placed in the chamber but the body will still remain in an upright position. By providing this chamber for the weight material, such material is hidden from view and there is no need for an exterior weight which might frighten the fish.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a lure of the class described including a flexible tail part and a body part, means for detachably connecting the front end of the tail part to the rear end of the body part and means detachably connected with the rear end of the tail part and extending rearwardly from the body part, said means holding the tail in a loop which will be acted on by the water, when the lure is drawn therethrough, to move the tail back and forth in a wave motion.

2. A lure of the class described comprising a body part having a rearwardly tapering rear portion provided with a vertically arranged hole and a channel, said hole and channel opening out through the top of the body part, a flat tail formed of resilient material and having a bead at its front end for fitting in the hole with the front portion of the tail passing through the channel, the rear end of the tail having a vertically arranged tubular part thereon, a U-shaped member of spring material having its bight passing through the rear portion of the body with its rear end bent to enter the tubular part of the tail, said U-shaped member holding the tail in a loop.

3. A lure of the class described comprising a body part having a rearwardly tapering rear portion provided with a vertically arranged hole and a channel, said hole and channel opening out through the top of the body part, a flat tail formed of resilient material and having a bead at its front end for fitting in the hole with the front portion of the tail passing through the channel, the rear end of the tail having a vertically arranged tubular part thereon, a U-shaped member of spring material having its bight passing through the rear portion of the body with its rear end bent to enter the tubular part of the tail, said U-shaped member holding the tail in a loop, and arms extending rearwardly from the rear part of the body and having grooves therein for receiving the legs of the U-shaped member.

4. A lure of the class described comprising a hollow body, the interior of which is divided into two chambers, means for placing weight material in the front chamber, rearwardly extending arms connected with the rear part of the body and having grooves therein, a spring U-shaped member having its bight passing through the rear portion of the body with its legs extending rearwardly and passing through the grooves, the rear ends of the legs being bent toward each other, a tail of flexible material and of considerable width, means for removably attaching the front end of the tail to the rear of the body between the arms, the rear of the tail having a vertically arranged tubular part for receiving the bent ends of the legs of the U-shaped member, said U-shaped member holding the tail in a curve which will be acted on by the water, when the lure is drawn therethrough, to move the tail back and forth in a wave motion and a supporting loop for a fish hook formed at the junction of the lower leg of the U-shaped member with its bent end.

GEORGE B. RAYBURN.